(12) United States Patent
Kim et al.

(10) Patent No.: US 10,659,949 B2
(45) Date of Patent: *May 19, 2020

(54) SCHEME FOR COMMUNICATION AND TRANSMITTING DISCOVERY SIGNAL IN MOBILE COMMUNICATION SYSTEM

(71) Applicant: Samsung Electronics Co., Ltd., Suwon-si, Gyeonggi-do (KR)

(72) Inventors: Soeng-Hun Kim, Suwon-si (KR); Kyeong-In Jeong, Yongin-si (KR); Sang-Bum Kim, Suwon-si (KR); You-Min Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,007

(22) Filed: Jan. 31, 2019

(65) Prior Publication Data

US 2019/0174296 A1 Jun. 6, 2019

Related U.S. Application Data

(63) Continuation of application No. 15/463,592, filed on Mar. 20, 2017, now Pat. No. 10,200,847, which is a
(Continued)

(30) Foreign Application Priority Data

Oct. 1, 2014 (KR) .................. 10-2014-0132510

(51) Int. Cl.
*H04W 4/80* (2018.01)
*H04W 8/00* (2009.01)
(Continued)

(52) U.S. Cl.
CPC .......... *H04W 8/005* (2013.01); *H04W 4/023* (2013.01); *H04W 4/80* (2018.02); *H04W 84/12* (2013.01);
(Continued)

(58) Field of Classification Search
CPC ....... H04W 4/023; H04W 4/80; H04W 84/10; H04W 84/12; H04W 88/04; H04W 88/06; H04W 88/08; H04W 8/005
See application file for complete search history.

(56) References Cited

U.S. PATENT DOCUMENTS

| 8,169,328 B2 | 5/2012 | Duvall et al. |
| 8,326,276 B2 | 12/2012 | Chin et al. |

(Continued)

FOREIGN PATENT DOCUMENTS

| CN | 1799233 A | 7/2006 |
| CN | 101080906 A | 11/2007 |

(Continued)

OTHER PUBLICATIONS

Chinese Office Action dated Apr. 25, 2019, issued in the Chinese Application No. 201510217400.2.

*Primary Examiner* — Jean A Gelin
(74) *Attorney, Agent, or Firm* — Jefferson IP Law, LLP

(57) ABSTRACT

A method for performing communication by a first communication device in a mobile communication system is provided. The method includes determining whether the first communication device is proximate to a nearby second communication device through a short-range communication link, enabling one of a first long-range communication link with a network or the short-range communication link with the second communication device based on the determination as to whether the first communication device is proximate to the second communication device, and receiv-
(Continued)

ing data from the network through the enabled one of the first long-range communication link with the network or the short-range communication link.

20 Claims, 9 Drawing Sheets

Related U.S. Application Data continuation of application No. 14/863,707, filed on Sep. 24, 2015, now Pat. No. 9,602,999.

(51) Int. Cl.
*H04W 4/02* (2018.01)
*H04W 88/06* (2009.01)
*H04W 88/04* (2009.01)
*H04W 84/12* (2009.01)
*H04W 88/08* (2009.01)

(52) U.S. Cl.
CPC ............ *H04W 88/04* (2013.01); *H04W 88/06* (2013.01); *H04W 88/08* (2013.01)

(56) References Cited

U.S. PATENT DOCUMENTS

| | | |
|---|---|---|
| 8,854,925 B1 | 10/2014 | Lee et al. |
| 9,026,051 B2 | 5/2015 | Etemad et al. |
| 2005/0272408 A1 | 12/2005 | Wilkes-Gibbs et al. |
| 2006/0255963 A1 | 11/2006 | Thompson et al. |
| 2007/0010256 A1 | 1/2007 | Klabunde et al. |
| 2007/0087790 A1 | 4/2007 | Worick et al. |
| 2007/0238475 A1 | 10/2007 | Goedken |
| 2008/0004002 A1 | 1/2008 | Chin et al. |
| 2008/0090612 A1* | 4/2008 | Glinka .................... H04L 63/18 455/557 |
| 2009/0011753 A1 | 1/2009 | Barnier |
| 2009/0016527 A1* | 1/2009 | Vigarie ................. H04L 9/0844 380/259 |
| 2009/0051649 A1 | 2/2009 | Rondel |
| 2009/0124281 A1 | 5/2009 | Takamune et al. |
| 2009/0228278 A1 | 9/2009 | Huh et al. |
| 2010/0309002 A1 | 12/2010 | Duvall et al. |
| 2011/0117907 A1 | 5/2011 | Hooli et al. |
| 2012/0309311 A1 | 12/2012 | Ohira et al. |
| 2013/0157631 A1 | 6/2013 | Wang et al. |
| 2013/0227647 A1 | 8/2013 | Thomas |
| 2013/0288668 A1 | 10/2013 | Pragada et al. |
| 2014/0036792 A1* | 2/2014 | Li ......................... H04W 40/20 370/329 |
| 2014/0094122 A1 | 4/2014 | Etemad et al. |
| 2014/0106677 A1 | 4/2014 | Altman |
| 2014/0218184 A1 | 8/2014 | Grant et al. |
| 2014/0289374 A1 | 9/2014 | Onjo |
| 2015/0131475 A1 | 5/2015 | Van Phan et al. |
| 2015/0185944 A1 | 7/2015 | Magi et al. |
| 2015/0210303 A1* | 7/2015 | Seidler .................... B61L 11/00 701/19 |
| 2015/0289308 A1 | 10/2015 | Kang et al. |
| 2015/0327001 A1 | 11/2015 | Kirshenberg et al. |
| 2015/0334657 A1 | 11/2015 | Newham et al. |
| 2015/0350766 A1 | 12/2015 | Schobel et al. |
| 2016/0088422 A1* | 3/2016 | Foster .................... G01S 5/0263 455/41.2 |
| 2016/0089572 A1 | 3/2016 | Liu et al. |
| 2016/0143079 A1 | 5/2016 | Yoon et al. |
| 2016/0173498 A1* | 6/2016 | Liu ....................... H04L 9/0656 713/155 |
| 2016/0174025 A1 | 6/2016 | Chaudhri et al. |

FOREIGN PATENT DOCUMENTS

| | | |
|---|---|---|
| CN | 102742256 A | 10/2012 |
| CN | 104065642 A | 9/2014 |
| WO | 2013/156056 A1 | 10/2013 |
| WO | 2013-163599 A2 | 10/2013 |
| WO | 2014-051791 A1 | 4/2014 |
| WO | 2014-062714 A1 | 4/2014 |

* cited by examiner

SCHEME FOR COMMUNICATION AND TRANSMITTING DISCOVERY SIGNAL IN MOBILE COMMUNICATION SYSTEM

CROSS-REFERENCE TO RELATED APPLICATION(S)

This application is a continuation application of prior application Ser. No. 15/463,592, filed on Mar. 20, 2017, which is a continuation application of prior application Ser. No. 14/863,707, filed on Sep. 24, 2015, which has issued as U.S. Pat. No. 9,602,999 on Mar. 21, 2017 and claimed the benefit under 35 U.S.C. § 119(a) of a Korean patent application filed on Oct. 1, 2014 in the Korean Intellectual Property Office and assigned Serial number 10-2014-0132510, the entire disclosure of each of which is hereby incorporated by reference.

TECHNICAL FIELD

The present disclosure relates to a method for changing communication modes and transmitting a discovery signal in a mobile communication system. More particularly, the present disclosure relates to a method for establishing a mobile communication link based on a wearable communication device and a method for transmitting a discovery signal based on call transmission.

BACKGROUND

As electronic devices are highly integrated and the application of wireless communication techniques becomes more common, wristwatch- or glasses-like wearable electronic devices are coming to market.

Wearable electronic devices benefit over typical cellular phones or smartphones for a portability perspective, and vice versa when it comes to communication performance and battery life.

If a wearable electronic device comes with cellular communication capability, the user who carries both the wearable device and a cellular phone ends up with two cellular communication-enabled devices.

As the case may be, the user may carry both or either of them. The user's demand to receive a service through cellular communications may be met once he is served with his desired service from either the wearable device or cellular phone. Accordingly, there is a need for a method that enables the user carrying one or more devices to manage long-range communication (e.g., cellular communication or Internet communication via Wi-Fi) and short-range communication (e.g., Bluetooth communication) of the devices, allowing for efficient use of hardware and communication resources and increased user convenience.

Further, a need also exists for a method for automatically transmitting out a discovery signal to inform the surroundings of the position or circumstance of the communication devices when the user cannot freely manipulate the communication devices, e.g., when the user is in an emergency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for managing cellular communication links of two or more communication devices and communication links between the communication devices when the user carries the communication devices.

Another aspect of the present disclosure is to provide a method for efficiently managing cellular communication links and receiving data when the user carries both a smartphone and a wearable communication device.

Another aspect of the present disclosure is to provide a method that allows a communication device with no cellular communication means or with the cellular communication of the communication device temporarily disabled to directly perform long-range communication via a short-range communication link.

Another aspect of the present disclosure is to provide a method for automatically transmitting a discovery signal under a particular circumstance by the user's manipulation or a particular operation of a communication device.

In accordance with an aspect of the present disclosure, a method for performing communication by a first communication device in a mobile communication system is provided. The method includes determining whether the first communication device is proximate to a nearby second communication device through a short-range communication link, enabling one of a first long-range communication link with a network or the short-range communication link with the second communication device based on the determination as to whether the first communication device is proximate to the second communication device, and receiving data from the network through the enabled one of the first long-range communication link with the network or the short-range communication link.

In accordance with another aspect of the present disclosure, a first communication device in a mobile communication system is provided. The first communication device includes a controller configured to determine whether the first communication device is proximate to a nearby second communication device through a short-range communication link, to enable one of a first long-range communication link with a network or the short-range communication link with the second communication device based on the determination as to whether the first communication device is proximate to the second communication device, and to receive data from the network through the enabled one of the first long-range communication link with the network or the short-range communication link, and a communication unit configured to communicate data through the long-range communication link or the short-range communication link under the control of the controller.

In accordance with another aspect of the present disclosure, a method for transmitting a discovery signal by a communication device is provided. The method includes triggering any one of a call dispatch, a user data transmission, and an application execution, determining whether any one of a destination phone number of the call, a destination address of the user data, and the application is included in previously stored information, determining whether there is a radio resource for discovery signal transmission, and transmitting the discovery signal based on a result of the determination that there is a radio resource for discovery signal transmission.

In accordance with another aspect of the present disclosure, a communication device for transmitting a discovery signal is provided. The apparatus includes a controller configured to trigger any one of a call dispatch, a user data transmission, and an application execution, to determine whether any one of a destination phone number of the call, a destination address of the user data, and the application is included in previously stored information, to determine whether there is a radio resource for discovery signal transmission, and to transmit the discovery signal based on a result of the determination that there is a radio resource for discovery signal transmission, and a communication unit configured to communicate the discovery signal under the control of the controller.

In accordance with another aspect of the present disclosure, a communication method by a first communication device in a mobile communication system is provided. The method includes transmitting a request for long-range communication support information to a nearby second communication device through a short-range communication link, receiving the long-range communication support information from the second communication device, and accessing an Internet network through the short-range communication link using the long-range communication support information, wherein the long-range communication support information includes at least one of Wi-Fi Access Point (AP) access information and long-term evolution (LTE) access information.

In accordance with another aspect of the present disclosure, a first communication device in a mobile communication system is provided. The first communication device includes a controller configured to transmit a request for long-range communication support information to a nearby second communication device through a short-range communication link, to receive the long-range communication support information from the second communication device, and to access an Internet network through the short-range communication link using the long-range communication support information, and a communication device configured to communicate data through the short-range communication link under the control of the controller, wherein the long-range communication support information includes at least one of Wi-Fi AP access information and LTE access information.

The cellular communication and inter-device communication of one or more devices carried by the user may be managed, thus leading to efficient use of hardware and communication resources of the devices along with increased user convenience.

A communication device equipped with a short-range communication means alone may directly perform long-range communication with the aid of a nearby communication device.

Under the circumstance that it is difficult to expect the user's manipulation, e.g., in an emergency, a discovery signal may be automatically transmitted out from the user's communication device by call dispatch or data transmission by the user, and discovery signal transmission considering the resources of the communication device is possible.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in wherein.

Throughout the drawings, like reference numerals will be understood to refer to like parts, components, and structures.

DETAILED DESCRIPTION

Figure 1:
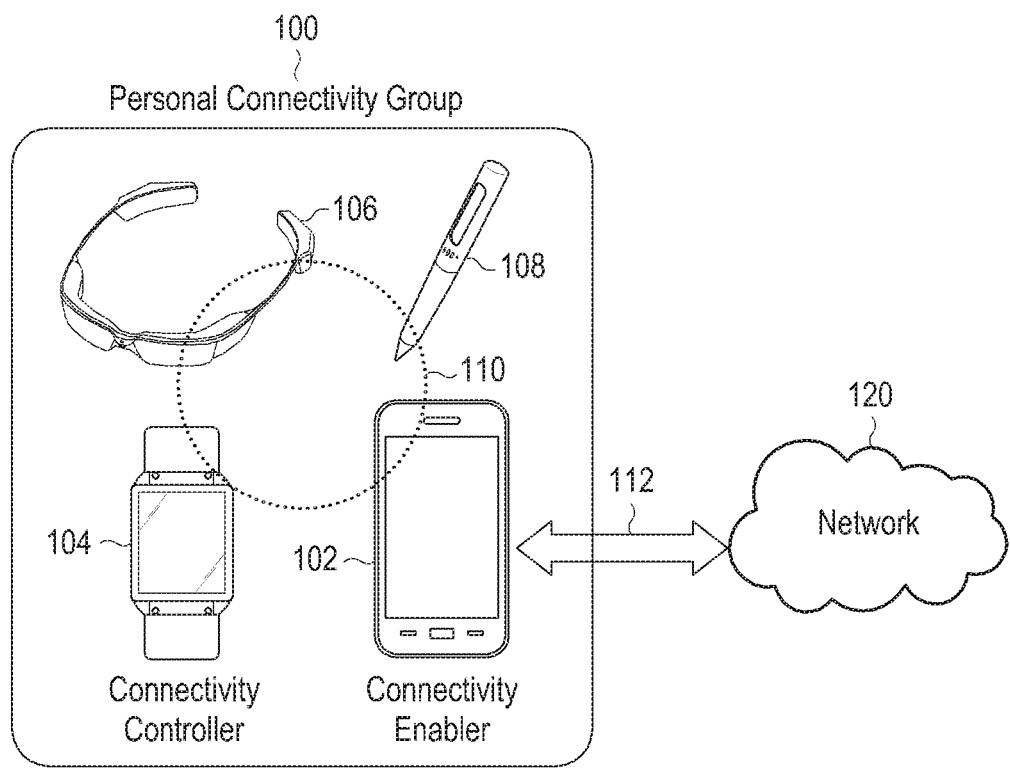
FIG. 1 illustrates a connectivity group including one or more communication devices according to a first embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before detailing the present disclosure, some terms as used herein may be interpreted as follows, for example. However, it should be noted that the present disclosure is not limited thereto.

In an embodiment of the present disclosure, a network (NW) is an entity communicating with a device and may be a base station (ST) over the network. Accordingly, the network may also be denoted a NodeB (NB), eNodeB (eNB), or access point (AP).

In an embodiment of the present disclosure, a proximity service function (ProSe) function is an entity over a network supportive of a discovery function of a communication device and may be a different entity from a base station or may be the same entity as a base station (when the ProSe function is implemented in the base station). The ProSe function may also be referred to as a device-to-device (D2D) function. In an embodiment of the present disclosure, D2D is the same in meaning as ProSe, and D2D and ProSe may be interchangeably used.

In an embodiment of the present disclosure, a communication device is an entity communicating with a network or other nearby communication device, and the communication device may be a cellular phone or a wearable communication device. The communication device may also be denoted a device, user equipment (UE), mobile station (MS), mobile equipment (ME), or terminal.

In an embodiment of the present disclosure, a wearable communication device means a communication device (e.g., a smartwatch, an armband, smart glasses, a smart contact lens, and the like) that may be worn or inserted by the user on his particular body part (e.g., his wrist, arm, head, or eyeball). More particularly, the term "communication device" as used herein is used to collectively refer to communication devices that are not the typical wireless phone style communication devices. Accordingly, in an embodiment of the present disclosure, a pen-shaped communication device, e.g., a smart pen, may also be denoted a wearable communication device. In this present disclosure, a wearable communication device may also be called a wearable device. For example, a smartwatch may be a commercial product, such as Galaxy Gear™, and smart glasses may be a commercial product, such as Google Glass™.

Now described are a first embodiment of a method in which a communication device determines a communication mode using a proximity degree and performs long-range communications, a second embodiment of a method in which a communication device, which may perform only short-range communication with the aid of other communication device performing long-range communication, directly performs long-range communication, and a third embodiment of a method in which a communication device transmits a discovery signal.

First, as the first embodiment of the present disclosure, an embodiment is described in which communication modes are changed based on a proximity degree between two or more communication devices.

FIG. 1 illustrates a connectivity group including one or more communication devices according to a first embodiment of the present disclosure.

Referring to FIG. 1, the user may be served with a communication service from a cellular network by carrying one or more communication devices that may perform long-range communication, wide area network (WAN) communication, such as long term evolution (LTE), universal mobile telecommunication system (UMTS), and web real time communication (WebRTC).

The one or more communication devices that may perform long-range communication may perform D2D communication with the other communication device through a short-range communication (SRC) link 110 and may form a personal connectivity group (PCG) 100 through the short-range communication link 110. The PCG is a group of communication devices that may be considered as being used by the user or as belonging, and all or some of the communication devices may perform long-range communication, such as a WAN connection. The PCG may be classified as the same PCG with the same indicator. For example, the communication devices may be identified as being to the same PCG using the same indicator. The PCG 100 may include at least one of, e.g., a cellular phone 102, a smartwatch 104, smart glasses 106, and a smart pen 108. The short-range communication link may be a direct communication link established among all the communication devices in the PGC 100 and may be implemented through a communication technique, such as, e.g., Bluetooth, Wi-Fi Direct, or ZigBee. The short-range communication link may be formed in a one-to-one or one-to-n manner.

The PCG of FIG. 1 may be called a peer device group (PDG), and the PDG is described below in connection with the second embodiment.

The PCG 100 may include a communication device serving as a connectivity controller (CC) 104 controlling D2D connection and connection with the cellular network and a communication device serving as a connectivity enabler (CE) 102 performing cellular communication with the cellular network.

The CC 104 is a device selecting and managing the CE 102. The CE 102 is a device in charge of inter-network (120) connection (or communication) with the devices belonging to the PCG 100 using a WAN communication technique-based long-range communication (LRC) link 112. Some communication devices 104, 106, and 108 in the PCG 100 may communicate with a network 120 by communicating through the short-range communication link 110 with the CE 102 that is linked with the network 120 through the long-range communication link 112. For example, the CE 102 may operate as a data communication hub between the network 120 and the communication devices in the PCG 100. In some cases, one communication device may serve as both the CC and the CE, and there may be two or more communication devices serving as the CE in one PCG.

Any communication device in the PCG 100 may serve as the CC or CE. Although FIG. 1 illustrates an example where the smartwatch 104 is the CC, and the cellular phone 102 is the CC, other communication device may be the CC or CE. Further, the CC and the CE may be the same communication device.

The determination (i.e., the role determination) as to which communication device is supposed to play a role as the CC or CE may be performed by the operation of each communication device in the PCG. In this case, the operation for the role determination may be conducted based on some rule that is shared by the communication devices in the PCG.

The rule for the role determination may be defined using at least one of a certain order of priority, whether the user carries the communication device, and information on remaining battery life. The order of priority may be managed by one or both of the CC and the CE. The order of priority may be set and stored as a particular value of a form that may be recognized by the communication devices in the PCG. The order of priority may be stored in the form of a priority list of the communication devices in the PCG. When multiple PCGs are there in the network, the priority list of each PCG may be shared between the multiple PCGs. Further, the priority list for one PCG may be shared in the PCG between the communication devices belonging to the PCG.

When the user carries a smartphone, a smartwatch, and smart glasses, the order of priority for serving as the CC may be determined, e.g., in the order of smartwatch>smart glasses>smartphone. The reason why the smartwatch has the highest priority in playing a role as the CC is that the smartwatch is highly likely to be with the user for most of the time and that there is little chance of a change in CC role to other communication device.

Further, in the above case, the order of priority for serving as the CE may be determined, e.g., in the order of smartphone>smartwatch>smart glasses. The reason why the smartphone has the highest priority in playing a role as the CE is that the smartphone carries better hardware resources and battery power as compared with the other communication devices and that there is little chance of a change in CE role to other communication device. The order of priority for serving as the CE may be varied by the information on the remaining battery life reported by each communication device to the CC. For example, when the smartwatch reports that the remaining battery life of the smartwatch is less than 10%, the smartwatch and the smart glasses may be changed in order of priority.

TABLE 1

| Communication device carried by user | CC | CE |
|---|---|---|
| smartphone, smartwatch, smart glasses | smartwatch | smartphone |
| smartphone, smartwatch | smartwatch | smartphone |
| smartphone, smart glasses | smart glasses | smartphone |
| smartwatch, smart glasses | smartwatch | smartwatch |
| smartphone | smartphone | smartphone |
| smartwatch | smartwatch | smartwatch |
| smart glasses | smart glasses | smart glasses |

Table 1 shows examples of the CC and the CE determined according to the rule obtained by combining the order of priority between devices and whether the user carries the communication device.

When the user carries all of the smartphone, the smartwatch, and the smart glasses, the smartwatch, which has the highest priority for the CC, and the smartphone, which has the highest priority for the CE, may be determined as the CC and the CE, respectively. However, unless among the communication devices the communication devices with the highest priority are worn, the communication devices with the next highest priority would be determined as the CC and the CE, respectively. Meanwhile, when only one communication device is present, the communication device may be determined to play a role as the CC and the CE.

First described is a method in which the communication devices in the PCG determine a communication device to operate as the CC.

Figure 2:
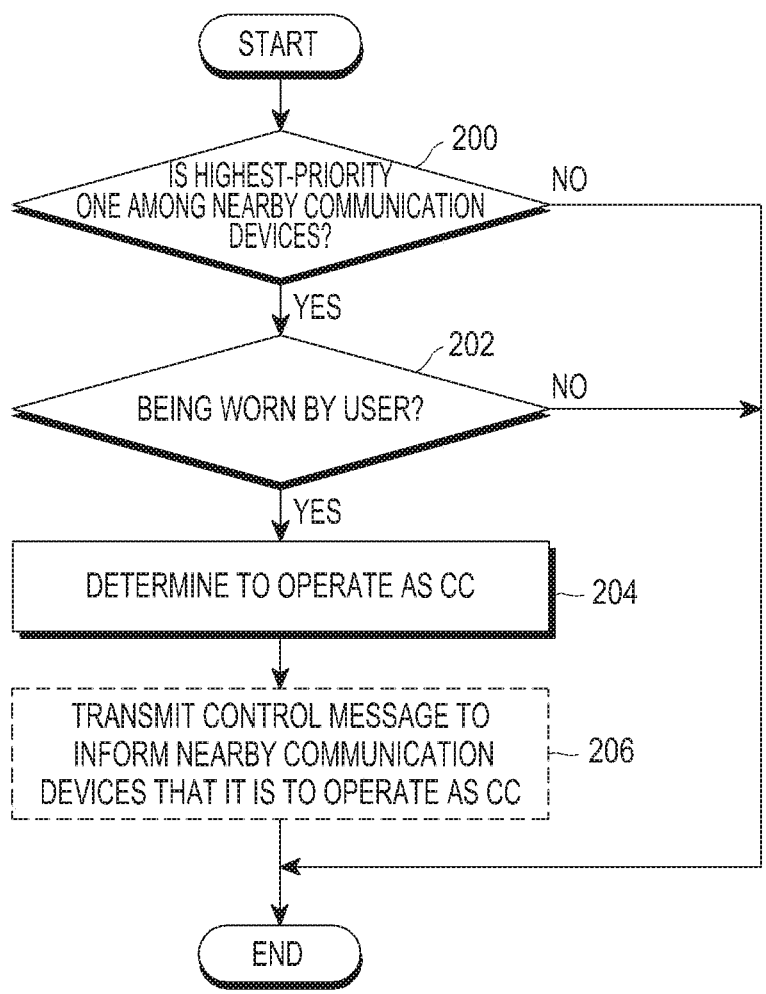
FIG. 2 illustrates a method in which a communication devices in a personal connectivity group (PCG) determine a communication device to operate as a connectivity controller (CC) according to a first embodiment of the present disclosure.

FIG. 2 illustrates a method in which a communication devices in a PCG determine a communication device to operate as a CC according to a first embodiment of the present disclosure.

Referring to FIG. 2, when the PCG does not have a communication device capable of playing a role as the CC, each communication device may determine whether the communication device is supposed to be the CC depending on the order of priority of the communication device and whether the communication device is being worn by the user.

Each communication device in the PCG determines if the communication device has the highest priority in the PCG in operation 200. If having the highest priority, the communication device may determine whether the communication device is being worn by the user in operation 202. Upon meeting the two conditions of having the highest priority in the PCG and being worn by the user, the communication device may determine the communication device to be the CC in operation 204. Selectively, the communication device may transmit a control message to ambient communication devices to inform them that the communication device is to operate as the CC in operation 206.

For example, the smartwatch with the highest priority may determine whether the smartwatch is to play a role as the CC by determining whether the smartwatch is being worn by the user. When the smartwatch is determined to be being worn by the user, the smartwatch may determine the smartwatch to be the CC and may inform the presence of the smartwatch to the other communication devices in the PCG by transmitting a control message to the other communication devices to report that the smartwatch is to operate as the CC. When the smartwatch is determined not to be being worn by the user, the smartwatch might not determine the smartwatch to be the CC. Selectively, when the smartwatch is determined not to be being worn by the user, the smartwatch may transmit a control message to inform that the smartwatch is not being worn by the user in order to aid the other communication devices in determining whether they are to play a role as the CC.

For the reason that there is no smartwatch in the PCG or the user does not wear the smartwatch, there might be no communication device to play a role as the CC in the PCG. In this case, the smart glasses with the next highest priority may determine whether the smart glasses are to play a role as the CC by determining whether the smart glasses are being worn by the user. When the smart glasses are determined to be being worn by the user, the smart glasses may determine the smart glasses to be the CC and may inform the presence of the smart glasses in the PCG to the other communication devices by transmitting any control message to the other communication devices. When the smart glasses are determined not to be being worn by the user, the smart glasses might not determine the smart glasses to be the CC. Selectively, when the smart glasses are determined not to be being worn by the user, the smart glasses may transmit a control message to inform that the smart glasses are not being worn by the user in order to aid the other communication devices in determining whether they are to play a role as the CC.

Now described is a method in which the communication devices in the PCG determine a communication device to operate as the CE.

Figure 3:
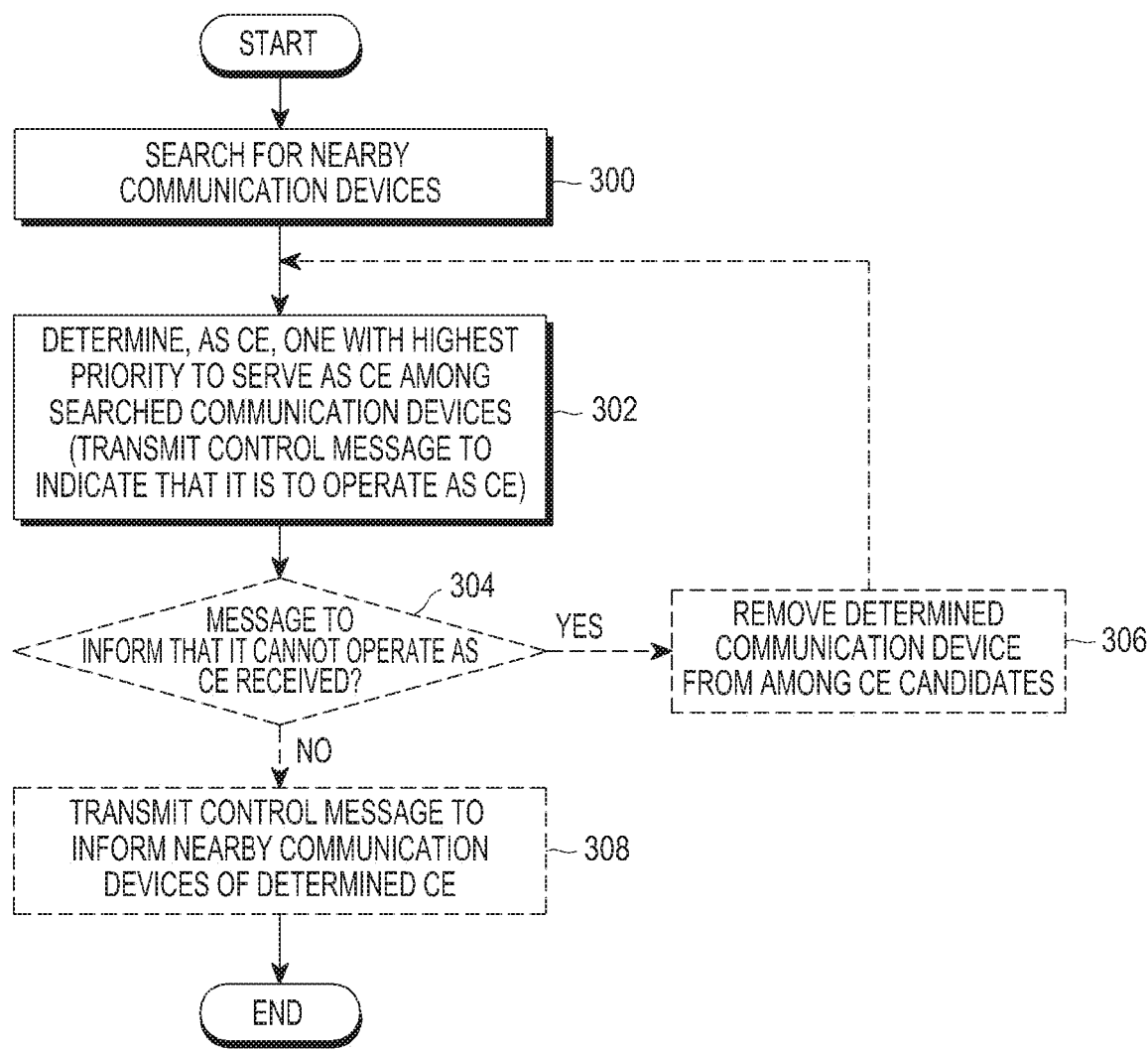
FIG. 3 illustrates a method in which a communication devices in a PCG determine a communication device to operate as a connectivity enabler (CE) according to a first embodiment of the present disclosure.

FIG. 3 illustrates a method in which the communication devices in a PCG determine a communication device to operate as a CE according to a first embodiment of the present disclosure.

Referring to FIG. 3, when there is no communication device, in the PCG, to play a role as the CE, the CC searches for ambient PCG communication devices using the short-range communication link in operation 300. The CC may determine the device with the highest priority to play a role as the CE among the searched communication devices as the CE in operation 302. In this case, the CC may transmit a control message to the communication device determined as the CE to instruct the determined communication device to operate as the CE. For example, the control message for instructing to operate as the CE is a control message transmitted by the CC to instruct the CE to enable a long-range communication (LRC) link.

In the operation 302 to determine the communication device to operate as the CE, whether the communication device is being worn by the user may be reflected. Unless the communication device determined as the CE is being worn by the user, the communication device determined as the CE may respond to the CC with a message indicating that the communication device cannot operate as the CE in operation 304. In this case, the CC removes the communication device having responded with the message from CE candidates in operation 306 and will newly determine a communication device to operate as the CE.

For example, the smartwatch playing a role as the CC identifies through the short-range communication link whether a smartphone is present in the PCG. If it is identified that there is a smartphone in the PCG, the CC may transmit, through the short-range communication link to the smartphone, a control message to instruct the smartphone to operate as the CE.

Selectively, upon reception of the control message, the smartphone may determine whether the smartphone is being carried by the user. If determined to be being carried by the user, the smartphone may transmit, to the CC, a message to inform that the smartphone accepts the CE role and may operate as the CE. The smartphone operating as the CE may provide a connection with an external network through a long-range communication link. Meanwhile, if determined not to be being carried by the user, the smartphone may transmit, to the CC, a message to inform that the smartphone cannot operate as the CE.

Selectively, if the determination of a communication device to operate as the CE is complete, the CC may transmit a control message to ambient communication devices to inform the communication device determined as the CE in operation 308.

The communication devices in the PCG may determine whether they are being carried by the user using various sensors. The smartwatch may determine whether the smartwatch is being worn by the user by determining whether the smartwatch contacts the user's skin or whether the heart beats through a contact sensor or a heartbeat sensor. The smart glasses may determine whether the smart glasses are being worn by the user by determining the user's pupil movement or whether the smart glasses contact the user's skin through an eyeball recognition sensor or contact sensor. The smart contact lens may determine whether the smart contact lens is being worn by the user by determining whether the smart contact lens contacts the user's eyeball using a blood sugar recognition sensor. The smartphone may determine whether the smartphone is being worn by the user by determining whether the user is on the move through a motion sensor. The smartphone may determine whether the smartphone is being carried by the user through a contact sensor or heartbeat sensor as well. Further, the smartphone may determine whether the smartphone is being carried by the user through whether the global positioning system (GPS) module of the smartphone is driven, through mobility obtained through the GPS module, or through whether the smartphone had performed communication during a recent period.

Meanwhile, there may occur some situations where the once determined CC should be changed in a particular event. For example, it may be the case that the remaining battery life of the smartwatch currently operating as the CC is reduced to a certain level (e.g., 5%) or less or the user takes off the smartwatch or smart glasses operating as the CC. The other communication devices present in the PCG do not receive signals from the CC through the short-range communication link and thus may determine that the CC is vacant. Thereafter, the other communication devices having lost the CC may periodically perform determination as to whether they should be a new CC by determining whether there is a device with a higher priority than themselves among approaching communication devices, as described above in connection with FIG. 2. As another example, the user may arbitrarily select a CC to which to be changed using the user interface (UI) of a communication device in the PCG. Communication devices available or unavailable in the PCG where the communication device belongs or other accessible PCG are displayed on the UI in a form noticeable to the user, and the user may select the CC from the displayed communication devices.

In an embodiment of the present disclosure, the proximity determination standard in a short-range communication scheme (e.g., Bluetooth) may apply, as is, to determination of the proximity between communication devices (determination as to whether the devices are positioned within a proximate distance). For example, the communication devices may determine the proximity therebetween by comparing the strength of a signal used (detected) in the short-range communication link with a threshold.

Meanwhile, there may occur some situations where the once determined CE should be changed in a particular event. For example, it may be the case that the remaining battery life of the smartwatch currently operating as the CE is reduced to a certain level (e.g., 5%) or less or the user leaves behind the smartphone operating as the CE and moves so that the proximity with the CE is deteriorated. Other communication devices (i.e., the CC) present in the PCG do not receive signals from the CE through the short-range communication link and thus may determine that the CC is vacant. Thereafter, the CC having lost the CE may determine the communication device with the next highest priority among ambient communication devices as a new CE and may transmit, to the determined communication device, a control message to instruct the determined communication device to operate as the CE, as described above in connection with FIG. 3. As another example, the user may arbitrarily select a CE to which to be changed using the UI of a communication device in the PCG. Communication devices available or unavailable in the PCG where the communication device belongs or other accessible PCG are displayed on the UI in a form noticeable to the user, and the user may select the CE from the displayed communication devices.

Further, there may occur the situation where the determined CC and CE are simultaneously changed. For example, when the communication device present in the PCG disconnects from the CE without prior notice nor does the communication device receive information on a new CE from the CC, the communication device may determine that the CC and the CE should be simultaneously changed. Thereafter, the communication device may determine whether the communication device should be a new CC as exemplified above in connection with FIG. 2. When the communication device is determined to operate as the new CC, the communication device, as the new CC, may designate a new CE as exemplified in connection with FIG. 3. However, unless the communication device is determined to operate as the new CC, the communication device may wait until the communication device receives a control message regarding the determination of a CE from a new CC. As another example, the user may arbitrarily select a CC and CE, to which to be changed, using the UI of a communication device in the PCG. Communication devices available or unavailable in the PCG where the communication device belongs or other accessible PCG are displayed on the UI in a form noticeable to the user, and the user may select the CC and CE from the displayed communication devices.

Figure 4:
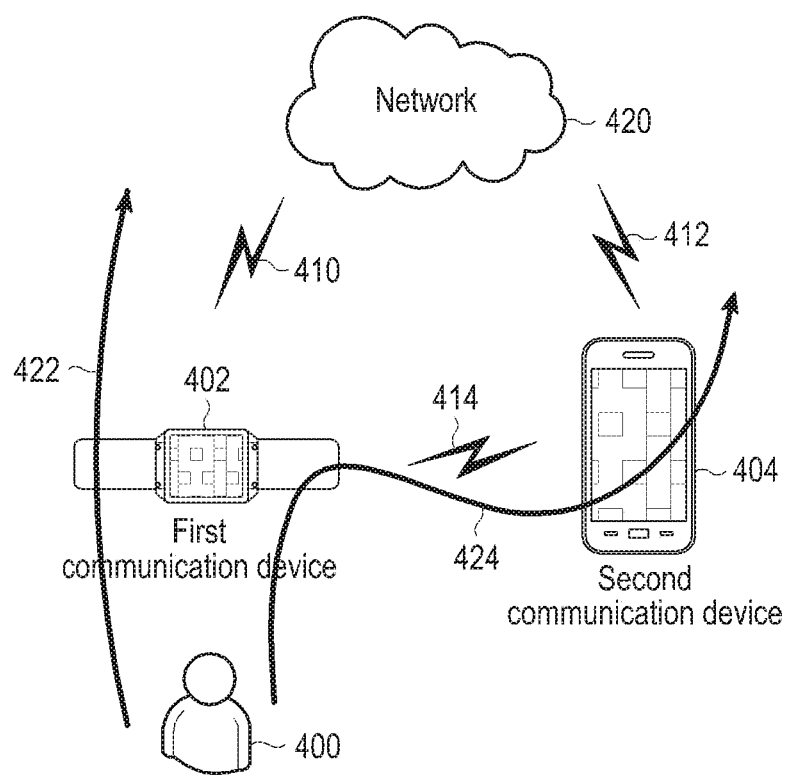
FIG. 4 illustrates a communication path to a cellular network, of a user with a smartphone and a wearable communication device according to a first embodiment of the present disclosure.

FIG. 4 illustrates a communication path to a cellular network, of a user with a smartphone and a wearable communication device according to a first embodiment of the present disclosure.

Referring to FIG. 4, the communication device operating as a CC may enable a mobile communication connection from at least one of a first communication device 402 and a second communication device 404 to an external network 420 based on a proximity between the first communication device 402 and the second communication device 404. In the example illustrated in FIG. 4, the first communication device 402 is a smartwatch, and the second communication device 404 is a smartphone.

When the first communication device 402 and the second communication device 404 is positioned within a reach (i.e., a proximate distance) of a short-range communication link 414 (e.g., Bluetooth, Wi-Fi Direct, Zigbee), the first communication device 402 playing a role as the CC may perform control to disable a first link 410 between the first communication device 402 and the network 420 and to enable a second link 412 between the second communication device 404 and the network 420. In this case, as the second communication device 404 performs cellular communication, data required by the first communication device 402, among data obtained from the network 420, may be forwarded through a third link 414 to the first communication device 402. Accordingly, a user 400 may be served with a communication service of the network 420 from the first communication device 402 through a path 424 passing through the third link 414, a short-range communication link, and the enabled second link 412. In such case, the second communication device 404 becomes a CE.

When the first communication device 402 and the second communication device 404 is positioned out of the reach (i.e., a proximate distance) of a short-range communication link 414, the first communication device 402 playing a role as the CC may perform control to enable the first link 410 between the first communication device 402 and the network 420 and to disable the second link 412 between the second communication device 404 and the network 420. In this case, the user 400 may be served with a communication service of the network 420 from the first communication device 402 through a path 422 passing through the enabled first link 410. In such case, the first communication device 402 becomes a CE.

Selectively, in a period (e.g., within a threshold time from the time when the short-range communication link has been lost) during which the short-range communication link 414 may have a chance of being restored although the first communication device 402 and the second communication device 404 are positioned out of the reach of the short-range communication link 414, the first communication device 402 playing a role as the CC may maintain the connection with the network 420 through two long-range communication links by enabling the first link as well as by the second communication link being currently enabled. In such case, the first communication device 402 and the second communication device 404 become CEs. The reason for simultaneously maintaining the two communication links during the threshold period is to prevent the phenomenon that the first communication device 402 and the second communication device 404 are repetitively disabled/enabled due to restoration of the short-range communication link 414 within the threshold period-so-called "ping-pong" phenomenon.

However, in a period (e.g., the threshold time after the short-range communication link has been lost) during which the first communication device 402 and the second communication device 404 are positioned out of the reach of the short-range communication link 414 and the short-range communication link 414 has no chance of being restored, the first communication device 402 playing a role as the CC may perform control to disable the second link 412 between the second communication device 404 and the network 420 without maintaining the connection with the network 420 through the two long-range communication links.

If the device carried by the user 400 is the first communication device 402, the first communication device 402 would play a role as the CC. Selectively, the first communication device 402, a smartwatch, may automatically enable or maintain the cellular communication function of the first communication device 402 and disable the cellular communication function of the second communication device 404 without receiving the user's separate manipulation.

On the other hand, if the device carried by the user 400 is the second communication device 404, the second communication device 404 may play a role as the CC. Selectively, the second communication device 404, a smartphone, may enable the cellular communication function of the second communication device 404 (i.e., the cellular communication function of the second communication device 404) and disable the cellular communication function of the first communication device 402 based on the user's manipulation.

Figure 5A:
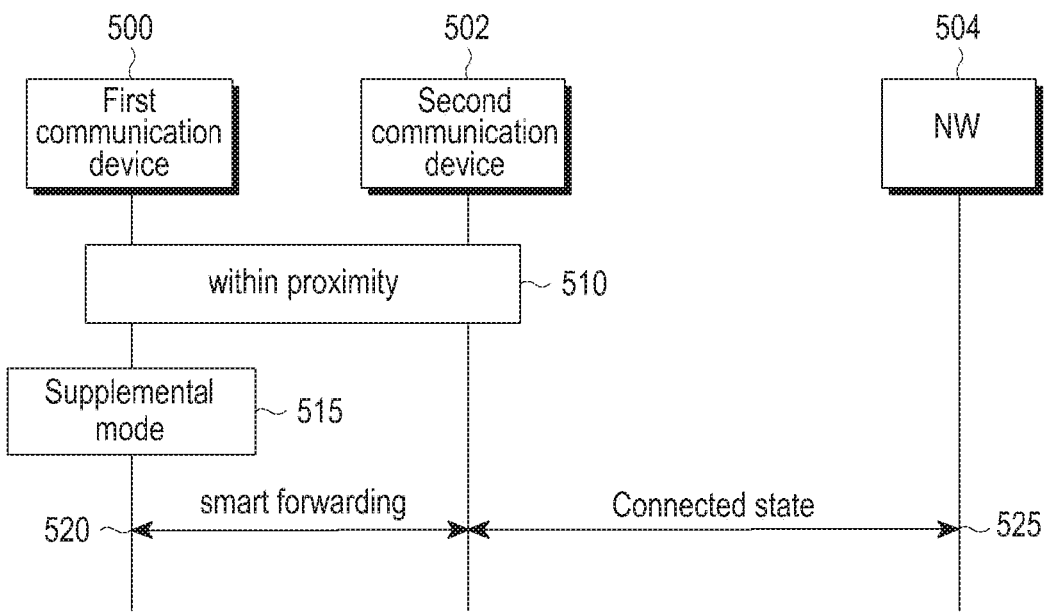
FIGS. 5A, 5B, and 5C illustrate a method in which two communication devices configure communication links with a network based on proximity according to a first embodiment of the present disclosure.
Figure 5B:
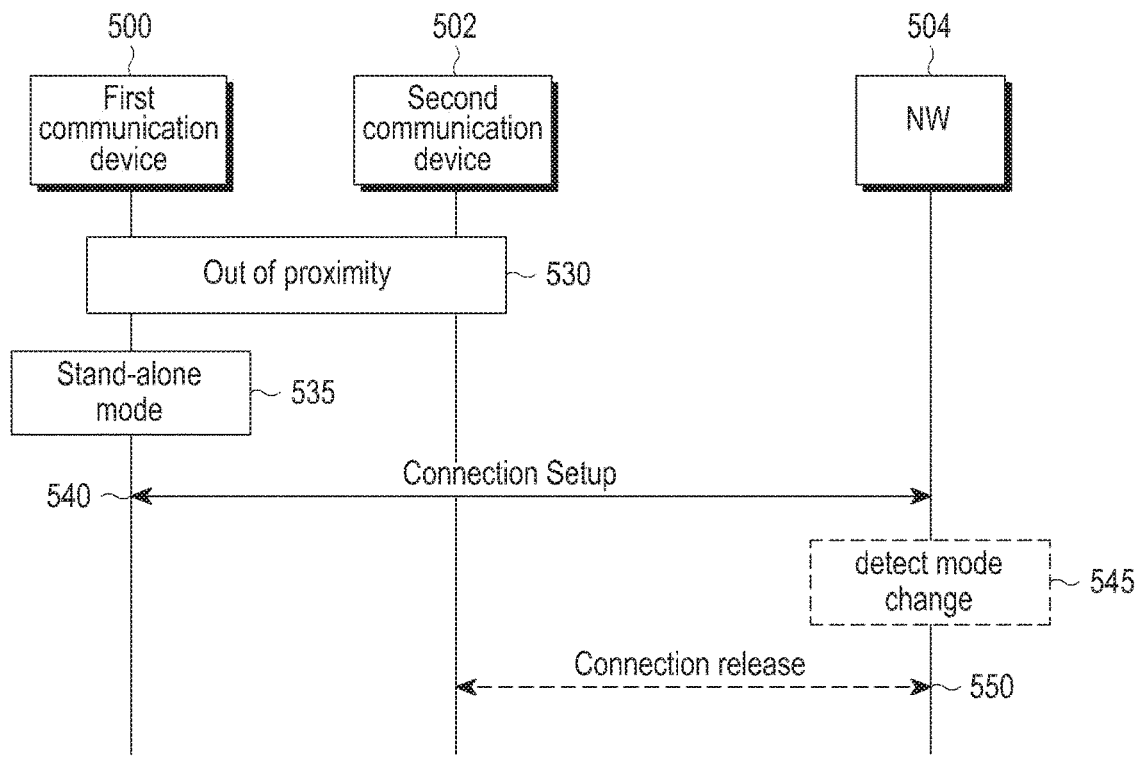
Figure 5C:
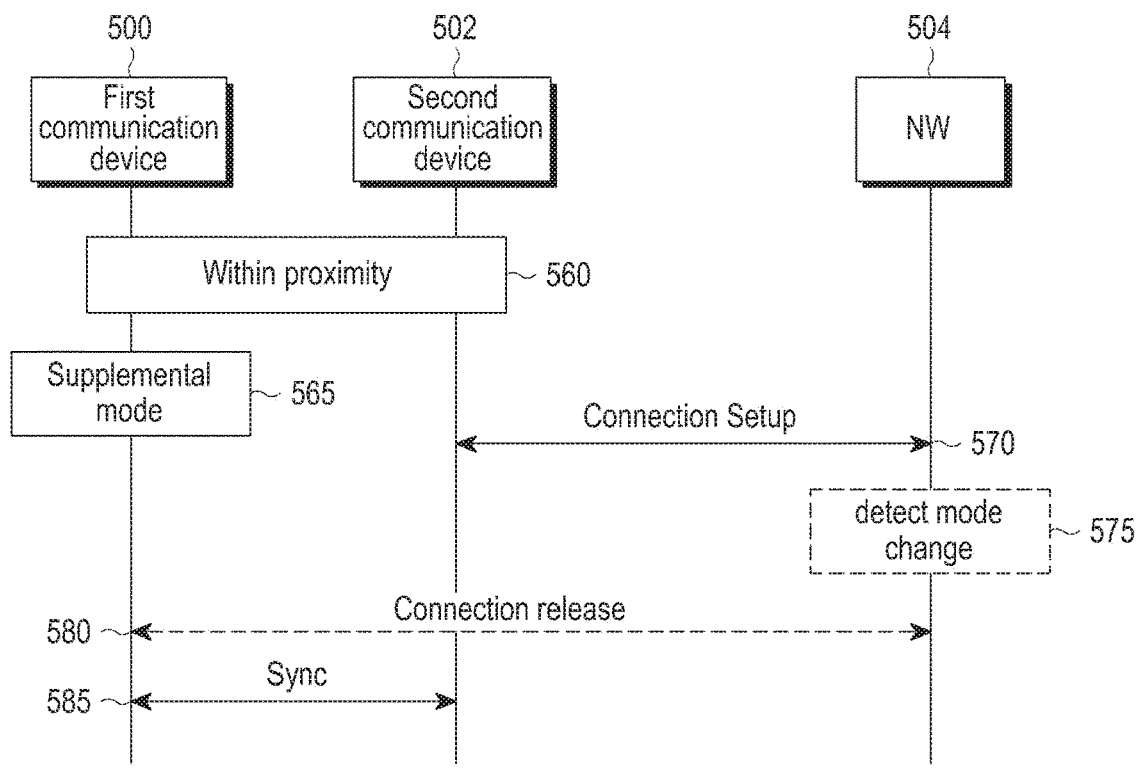

FIGS. 5A, 5B, and 5C illustrate a method in which two communication devices configure communication links with a network based on proximity according to a first embodiment of the present disclosure.

Referring to FIG. 5A, an operation of a first communication device 500 operating in supplemental mode when the two communication devices are positioned within a proximate distance is illustrated.

The supplemental mode is a mode in which the first communication device 500 is connected with a cellular network through a proximate second communication device, i.e., a mode in which the first communication device 500 connects to the cellular network by interworking with other communication device.

When the first communication device 500 is determined to be positioned within a reach (i.e., a proximate distance) of a short-range communication link with a second communication device 502 in operation 510, the first communication device 500 may be determined to operate in supplemental mode in operation 515.

The second communication device 502 forms a long-range communication link with a network (NW) 504 and maintains the connected state (under the control of a CC) in operation 525. In this case, the first communication device 500 may operate as the CC, and the second communication device 502 operates as a CE. The second communication device 502 may forward, through the short-range communication link to the first communication device 500, data required by the first communication device 500 among data received from the network 504 in operation 520.

Referring to FIG. 5B, an operation of the first communication device 500 operating in stand-alone mode when the two communication devices are positioned out of proximate distance is illustrated.

The stand-alone mode is a mode in which the first communication device 500 independently connects to the cellular network without the aid of other communication device.

For example, when the user leaves behind his smartphone being operated as the CE, the smartwatch being worn by the user may be determined to operate in stand-alone mode.

When the first communication device 500 determines that the second communication device 502 is positioned out of the reach (i.e., the proximate distance) of the short-range communication link in operation 530, the first communication device 500 may be determined to operate in stand-alone mode in operation 535. The first communication device 500 may perform a connection setup to form a long-range communication link with the network 504 (under the control of the CC) in operation 540. In this case, the first communication device 500 may simultaneously operate as a CC and a CE. The first communication device 500 may receive data through the long-range communication link established by the first communication device 500 with the network 504.

Selectively, the network 504 may detect a mode change in the first communication device 500 in operation 545. If the network 504 has been connected with the second communication device 502, the network 504 may perform an operation to release the connection with the second communication device 502 in operation 550. Alternatively, the connection releasing operation 550 may also be performed by the second communication device 502 that has detected that the first communication device 500 is positioned out of the proximate distance.

Referring to FIG. 5C, an operation of the first communication device 500 operating in supplemental mode when the two communication devices are positioned back within the proximate distance is illustrated.

For example, when the user is back and carries his smartphone, the smartwatch being worn by the user may be determined to operate back in supplemental mode.

When the first communication device 500 determines that the second communication device 502 is positioned back within the proximate distance in operation 560, the first communication device 500 may be determined to operate back in supplemental mode in operation 565. The second communication device 502 may perform a connection setup operation to form a long-range communication link with the network 504 (under the control of the CC) in operation 570. In this case, the first communication device 500 may operate as the CC, and the second communication device 502 operates as the CE. The second communication device 502 may forward, through the short-range communication link to the first communication device 500, data required by the first communication device 500 among data received from the network 504 in operation 585.

Selectively, the network 504 may detect a mode change in the first communication device 500 in operation 575. If the network 504 has been connected with the first communication device 500, the network 504 may perform an operation to release the connection with the first communication device 500 in operation 580. Alternatively, the connection releasing operation 580 may also be performed by the first communication device 500 that has detected that the second communication device 502 is positioned within the proximate distance.

The CC and CE described above in connection with the first embodiment may also apply to wearable Internet of Things (TOT) gateways.

The wearable IoT means IoT applying between wearable communication devices. The wearable IoT gateway means a device that collects data from a group of IoT devices, transfers the data to a server over the Internet or distributes data received from the server over the Internet to the IoT devices. The wearable IoT may be denoted an IoT hub. For example, a health sensor unable to perform WAN communication and at least one other device able to perform WAN communication may form one PCG. In this case, the CC (e.g., an IoT gateway) in the PCG selects one of WAN-communicable devices as a CE and allows heat data (various data collected from a human body, such as blood pressure, body temperature, or heartbeat) collected by health sensors to be transferred to the CE. The health sensors are devices that are attached or implanted in various parts of a human body to collect or transfer bio signals, and the health sensors cannot perform WAN communication but may communicate with the IoT gateway through a short-range communication link.

By way of example, the CC in the PCG may control the heath sensors to directly transmit the health data to the CE through the short-range communication link. As another example, the CC in the PCG may control a separate collecting device to collect and store the health data from the health sensors and transmit the health data to the CE through the short-range communication link. The CE in the PCG may transfer the received health data through long-range communication to a certain server over the Internet, which manages the health data.

In this case, the CE in the PCG may play a role as an IoT gateway, and the CC in the PCG may determine and manage a device to operate as an IoT gateway through the above-described method.

A method in which a communication device only capable of short-range communication directly performs long-range communication with the aid of a device capable of long-range communication is described below, according to a second embodiment of the present disclosure.

As described above, a peer device group (PDG) may be configured in the same form as the PCG of FIG. 1. According to the second embodiment of the present disclosure, any communication device in the PCG may perform communication with a network more efficiently by directly performing long-range communication with the aid of other long-range communicable communication device. The communication device may be a communication device incapable of independent cellular communication (e.g., LTE or HSPA).

Table 2 shows the communication capabilities of communication devices configuring the PDG.

TABLE 2

|  | long-range communication (LRC) | | | short-range communication (SRC) |
| --- | --- | --- | --- | --- |
|  | LTE | HSPA | Wi-Fi | Bluetooth |
| smartphone | ○ | ○ | ○ | ○ |
| smartwatch | ○ | X | ○ | ○ |
| smart glasses | X | X | ○ | ○ |
| health sensor | X | X | X | ○ |
| smart pen | X | X | X | ○ |

For example, the smart glasses in the PDG, although not equipped with a long-range communication function, e.g., LTE or high speed packet access (HSPA), is equipped with a long-range communication function, e.g., Wi-Fi. In this case, the smart glasses may be implemented to directly perform long-range communication (e.g., Wi-Fi) using long-range communication assistance information provided from the smartphone.

Figure 6:
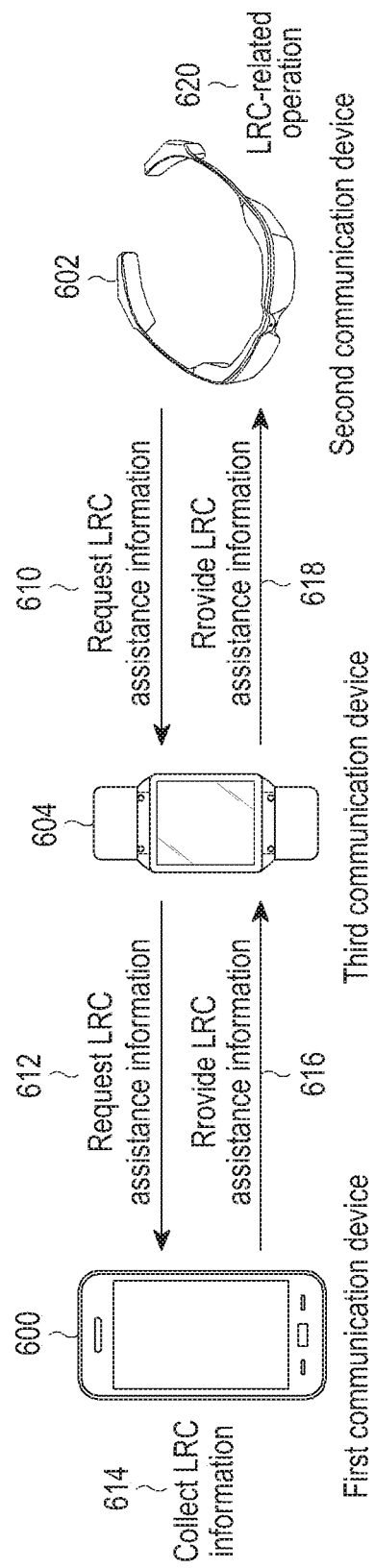
FIG. 6 illustrates a long-range communication method by a communication device according to a second embodiment of the present disclosure.

FIG. 6 illustrates a long-range communication method by a communication device according to a second embodiment of the present disclosure.

Referring to FIG. 6, a first communication device 600 collects long-range communication assistance information and provides the assistance information to a second communication device 602. For example, the first communication device 600 may be a smartphone with a cellular communication function, e.g., LTE or HSPA.

The second communication device 602 may perform an operation related to the LRC using the assistance information provided from the first communication device 600. For example, the second communication device 602 may be smart glasses with a Wi-Fi communication function. The LRC-related operation may be an operation in which the second communication device 602 directly performs LRC communication by using short-range communication and the assistance information.

A third communication device 604 may play a role to monitor the LRC circumstance in the PDG and relay the assistance information from the first communication device 600 to the second communication device 602. The communication device playing the same role as the second communication device 602 may be referred to as a PDG controller. For example, the third communication device 604 may be a communication device, such as a smartwatch that is equipped with a short-range communication function and has high priority of serving as the CC.

A method in which the second communication device 602 performs the LRC-related operation with the aid of the first communication device 600 is described below with reference to FIG. 6.

The second communication device 602 transmits a request for LRC assistance information to the first communication device 600 with an LRC function. Selectively, there may be the third communication device 604 as a PDG controller relaying the request for the LRC assistance information. In this case, the second communication device 602 transmits an LRC assistance information request to the third communication device 604 in operation 610 and the third communication device 604 may transfer the LRC assistance information request to the first communication device 600 in operation 612.

When receiving the LRC assistance information request from the second communication device 602, the first communication device 600 collects LRC assistance information using the LRC communication function in operation 614.

The first communication device 600 transmits the collected LRC assistance information to the second communication device 602. Selectively, there may be the third communication device 604 as a PDG controller relaying the transfer of the LRC assistance information. In this case, the first communication device 600 transmits the LRC assistance information to the third communication device 604 in operation 616 and the third communication device 604 may transfer the LRC assistance information to the second communication device 602 in operation 618.

When receiving the LRC assistance information, the second communication device 602 may perform an LRC-related operation using the LRC assistance information in operation 620.

Table 3 describes examples of the LRC assistance information transferred from the first communication device 600 to the second communication device 602 and an example of the LRC-related operation performed by the second communication device 602.

TABLE 3

| first communication device | second communication device | third communication device | LRC | LRC assistance information | scenario | operation of second device |
|---|---|---|---|---|---|---|
| smartphone | smart glasses | smartwatch | Wi-Fi | discovery information: information relating to AP performing communication through smartphone Wi-Fi (SSID, channel information, and the like) | (1) necessity for smart glasses to do Wi-Fi communication occurs | quick Wi-Fi access using discovery information |
| smartphone | smart glasses | smartwatch | Wi-Fi | SIB 17, ANDSF information: SSID list, offloading policy, Wi-Fi access authentication information | (2) necessity for smart glasses to do Wi-Fi communication occurs | initiate Wi-Fi search |
| smartphone | smart glasses | smartwatch | Wi-Fi | whether Wi-Fi signal is detected detected Wi-Fi AP information | (3) necessity for smart glasses to do Wi-Fi communication occurs | initiate Wi-Fi search |
| smartphone | smart glasses | smartwatch | LTE | first access information LTE serving cell information system information | (4) necessity for smart glasses to do LTE communication occurs | quick LTE access using access information |
| smartphone | smart glasses | smartwatch | LTE | second access information security parameter, C-RNTI, radio configuration, | (5) necessity for smart glasses to do LTE | First device terminates LTE communication, second device |

TABLE 3-continued

| first communication device | second communication device | third communication device | LRC | LRC assistance information | scenario | operation of second device |
|---|---|---|---|---|---|---|
| | | | | S-TMSI | communication switching occurs | initiates LTE communication. Use credential information provided upon initiation of LTE communication. AKA/security setup process omitted |

When the second communication device happens to have necessity to directly perform Wi-Fi communication (scenario (1) in Table 3), the LRC assistance information received by the second communication device from the first communication device may contain discovery information. For example, the discovery information may be information related to an access point (AP) performing communication through the Wi-Fi function of the smartphone (first communication device), i.e., SSID) or channel information. The second communication device may perform long-range communication by quick Wi-Fi access using the discovery information.

Alternatively, when the second communication device happens to have necessity to directly perform Wi-Fi communication (scenario (2) in Table 3), the LRC assistance information received by the second communication device from the first communication device may contain system information block (SIB) 17 information. For example, the SIB 17 information may contain an SSID list, an offloading policy, and Wi-Fi authentication information. The second communication device may initiate a search for a Wi-Fi channel which the second communication device is to access using the SIB 17 information. The SIB 17 information is system information providing the Wi-Fi-related information owned by the network provider and may follow what has been set forth in 3GPP standard TS 36.331. The offloading policy is information designating what traffic is to be transmitted through Wi-Fi and may follow what has been set forth in, e.g., 3GPP standard TS 36.331.

Alternatively, when the second communication device has necessity to directly perform Wi-Fi communication (scenario (3) in Table 3), the LRC assistance information received by the second communication device from the first communication device may contain information as to whether a Wi-Fi signal is detected. For example, the information as to whether a Wi-Fi signal is detected may contain detected Wi-Fi AP information (e.g., SSID, extended SSID (ESSID), and channel number of Wi-Fi AP). The second communication device may initiate a search for a Wi-Fi channel which the second communication device is to access using the detected Wi-Fi AP information. The SSID, ESSID, Wi-Fi channel number, or Wi-Fi access authentication information follows what is set forth in the IEEE 802.11 standard.

Alternatively, when the second communication device has necessity to directly perform LTE communication (scenario (4) in Table 3), the LRC assistance information received by the second communication device from the first communication device may contain first access information. The first access information is all or some of the information necessary for the second communication device to access an LTE network and may contain information on the LTE serving cell and system information. The second communication device may quickly access the LTE network using the first access information. Specifically, the first access information may contain information related to the current serving cell of the first communication device, e.g., frequency information, e.g., E-UTRA absolute radio frequency channel number (EARFCN), a cell identifier, e.g., physical cell identifier (PCID), downlink feedback channel configuration information of serving cell, current system frame number (SFN) of serving cell, and random access channel configuration information of serving cell. The definitions or uses of the examples of the first access information may follow what has been set forth in TS 36.331.

Alternatively, when the second communication device has necessity for LTE communication switching (scenario (5) in Table 3), the LRC assistance information received by the second communication device from the first communication device may contain second access information. The second access information is all or some of the information necessary for the second communication device to access an LTE network and may contain, e.g., security parameter, cell-radio network temporary identifier (C-RNTI), radio configuration information, and SAE-temporary mobile subscriber identity (S-TMSI). In this case, the first communication device may terminate the LTE communication, and the second communication device may directly initiate LTE communication. The second communication device may omit the authentication and key agreement (AKA) or security setup process in the process of initiating the LTE communication using the security parameter (e.g., credential information). Accordingly, the second communication device may more quickly perform the switching process. Specifically, the security parameter may be information on the security key currently in use or information on the counter to be used in scrambling/descrambling. The radio configuration information may be, e.g., physical layer configuration information, media access control (MAC) configuration information, or radio bearer configuration information currently configured in the first communication device.

The PDG controller regularly determines the state of the communication devices belonging to the PDG and enables at least one CE (the communication device performing LRC in the PDG and providing LRC assistance information) in the PDG to properly work all the time based on the user's preference or battery condition. In some cases, the PDG controller may increase the data rate by operating two or more CEs. When the PDG controller operates two or more CEs, LRC assistance information available for one CE may be shared with other CEs, thus enhancing the efficiency of the LRC-related operation.

The user's preference related with the number of CEs in the PDG may be input through the interface of one of the communication devices belonging to the PDG or directly determined by the PDG controller considering the condition information, for example. For example, if the communication devices in the PDG are under poor battery conditions, the communication devices may be preferable to operate only one CE. Or, if a service creating heavy traffic is initiated or occurrence of heavy traffic is observed for a certain period or more, two or more CEs in the PDG may be operated. In this case, the plurality of CEs may use the same or different long-range communication techniques.

Now described is a method in which a communication device is automated to periodically transmit device-to-device (D2D) discovery messages according to a third embodiment of the present disclosure.

When a communication device transmits a particular call (e.g., an emergency call, such as a 911 call), the communication device may be important to transmit a signal (i.e., a discovery signal) for informing the position of the communication device. Further, from a perspective of the nature of emergency, the dispatch of a discovery signal needs to be blocked off, as possible, from manipulation or interference by the user using the communication device. For example, in such cases where the emergency call is abruptly disconnected, the user cannot speak out, or the user cannot manipulate the communication device, it is difficult to expect the user's manipulation for transmitting out a discovery signal.

In some cases, the communication device, even without connection (e.g., a radio resource control (RRC) connection) with a base station, needs to inform the position of the communication device around by transmitting a discovery signal.

The communication device, when positioned indoors, is unable to do global positioning system (GSP) transmission. Accordingly, the GPS cannot be an alternative available for transmission of position information upon emergency, and neither can WLANs with small signal transmission coverage. Meanwhile, standardization of the D2D discovery function is being researched in the recent LTE standard, Rel-12.

The present disclosure proposes a method in which a communication device automatically performs periodic transmission of D2D discover messages upon transmitting a particular call or upon triggering an operation of transmitting data or an operation of driving a particular application.

Figure 7:
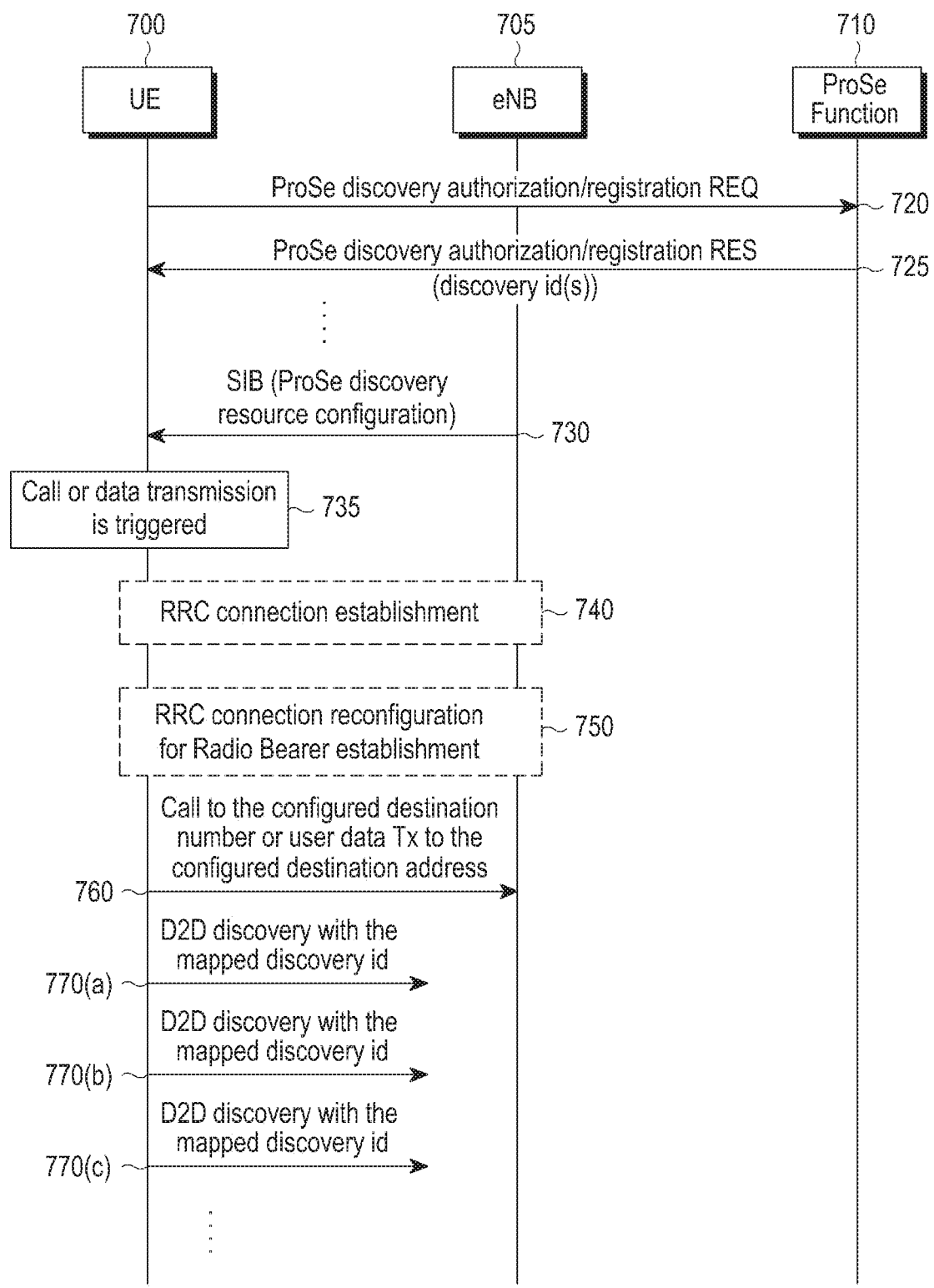
FIG. 7 illustrates a procedure in which a communication device (UE) communicates with a base station and a ProSe function to transmit a discovery signal according to a third embodiment of the present disclosure.

FIG. 7 illustrates a procedure in which a communication device (UE) communicates with a base station and a ProSe function to transmit a discovery signal according to a third embodiment of the present disclosure.

Referring to FIG. 7, a communication device (UE) 700 transmits a ProSe discovery authentication/registration request (REQ) to a ProSe function 710 over a network in operation 720. The communication device 700 is a device, such as a UE, supportive of a D2D discovery communication function. The ProSe function 710 may set up parameter values related to authentication/registration for a D2D discovery user (or device). For example, the ProSe function 710 may allocate a ProSe discovery ID to be contained in the transmitted discovery signal.

When receiving the ProSe discovery authentication/registration request 720, the ProSe function 710 transmits a ProSe discovery authentication/registration response (RES) to the communication device 700 in operation 725. The ProSe function 710 may inform, through the ProSe discovery authentication/registration response message, whether the ProSe discovery authentication/registration of the communication device 700 or user succeeds or fails. The ProSe function 710 may allocate a discovery ID to be transmitted by the communication device 700 or user and may include the same in the ProSe discovery authentication/registration response message. The discovery ID may be an ID for identifying the use of discovery (e.g., for emergency or advertisement), the user of the communication device 700, the communication device 700, or an application operating on the communication device 700. Selectively, the ProSe function 710 may include a destination phone number of the call along with the discovery ID for call dispatch, include the destination address of the data along with the discovery ID for data transmission, and in the case of driving an application, include the application and a discovery ID mapped with the application.

At any time, a base station 705 (e.g., an eNB in the LTE system) over the network may transfer ProSe discovery resource configuration information to be used by the communication device 700 for discovery transmission by broadcasting system information blocks (SIBs) to the UEs in the cell in operation 730. The communication device 700 may obtain the resource configuration information to be used when transmitting a ProSe discovery message in the cell by receiving the SIB 730 broadcast in the cell. For example, if the resource configuration information is information related to a radio resource pool, the resource configuration information may indicate the position of the radio resource pool in the time domain and frequency domain.

When the communication device 700 triggers dispatch of a particular call, triggers data transmission, or drives a particular application in operation 735 by the user's manipulation or a preset condition, the communication device 700 may initiate an operation for discovery transmission. For example, the particular call triggering the discovery signal transmission may be replaced with other type of user input. For example, the communication device 700 may also trigger the operation of automatically transmitting the discovery signal by an operation of transmitting data, an operation of driving a particular application, or an operation of pressing an emergency button provided at a position of the communication device 700 or an operation of pressing an emergency button output at a position on the screen of the communication device.

Selectively, the communication device 700 may establish an RRC connection with the base station 705 in operation 740. If the communication device 700 establishes the RRC connection, the base station 705 happens to be able to communicate a UE-dedicated control message for the UE.

Selectively, the communication device 700 may configure a radio bearer (RB) for transmission of user data through an RRC connection reconfiguration procedure with the base station 705 in operation 750. In this case, the configuration information of the radio bearer may be delivered to the communication device 700, and the communication device 700 may allocate dedicated radio resources to be used for ProSe discovery transmission.

The communication device 700 may transmit a call, transmit user data, or drive a particular application in operation 760.

The communication device 700 transmits a ProSe discovery signal including a discovery ID corresponding (mapped) to the operation triggered in operation 735 in operation 770(*a*). For example, if the call has been triggered with a particular number preset by the user of the communication device 700, the ProSe function 710, or communication provider, if the data transmission has been triggered with a destination address preset by the user, the ProSe function 710, or the communication provider, or if the application corresponds to an application preset by the user, the ProSe function 710, or the communication provider, the communication device 700 periodically transmits discovery signals including the discovery ID mapped with the particular number or destination address in operations 770(*a*), 770(*b*), and 770(*c*).

The power control for periodic transmission of the discovery message may be operated depending on various alternatives. A first alternative is a method in which the power of discovery transmission is divided into N operations (N>1), and different amounts of transmission power are configured for transmission periods, respectively. As an example, the communication device 700 may enable the discovery signal to reach various arrival ranges by randomizing the discovery transmission power. This case is advantageous in that the position information of the communication device 700 may be informed in various radii of coverage. A second alternative is a method in which, upon transmission, the discovery transmission power at each transmission period is reduced to a particular threshold or less. By way of example, the position of the communication device 700 may be informed even in a very small range by minimizing the discovery transmission power of the communication device 700 and resultantly minimize the UE's power consumption. A third alternative is a method that determines whether the communication device 700 receives a GPS signal in determining the discovery transmission power at each transmission period. For example, when a GPS signal is received, the discovery transmission power may be minimized, and if no GPS signal is received, a discovery signal may be transmitted with a certain amount of power or more. Which one of the above alternatives is to be chosen by the communication device 700 may be determined by the user's prior settings or settings made when the discovery service is registered.

A radio resource used by the communication device 700 to transmit the ProSe discovery may be allocated through the SIB 730 broadcast form the base station 705 or the RRC connection reconfiguration procedure 750. In other words, if the communication device 700 has been allocated a dedicated radio resource for discovery transmission in the RRC connection reconfiguration procedure 750, the communication device 700 may transmit the discovery signal through the transmitted radio resource, and if the communication device 700 has received information on the radio resource pool from the SIB 730, the communication device 700 may select a resource to be used from the radio resource pool and transmit the discovery signal through the selected resource.

It should be noted that the ProSe discovery transmission operation 770 has no cause-and-result relation, in order, with the call dispatch, data transmission, or application driving operation 760. In other words, one of operations 760 and 770 may be performed earlier than the other, and the operations may be performed at the same time.

Meanwhile, the user may abort the periodic discovery transmission in operations 770(*a*), 770(*b*), and 770(*c*) by manipulating the communication device 700 through a particular user interface or expiration of a particular timer. In this case, the communication device 700 may require a particular user input (e.g., a password) for user identification in order to identify whether the abortion of discovery transmission is valid.

Further, after the communication device 700 has triggered the operation for discovery signal transmission, other wearable device, as carried by the user, than the communication device 700 may periodically transmit D2D discovery signals as well. For example, when the battery capacity of the smartphone transmitting discovery signals is reduced to a certain level or less, other wearable communication device of the user carrying the smartphone may also transmit the discovery signal. An example of the wearable device may be a bracelet-style communication device or a smartwatch.

In the instant embodiment of the present disclosure, the user may apply and subscribe to a service for the discovery signal transmission method, or the user may set up an automatic discovery message transmitting function in his communication device.

Figure 8:
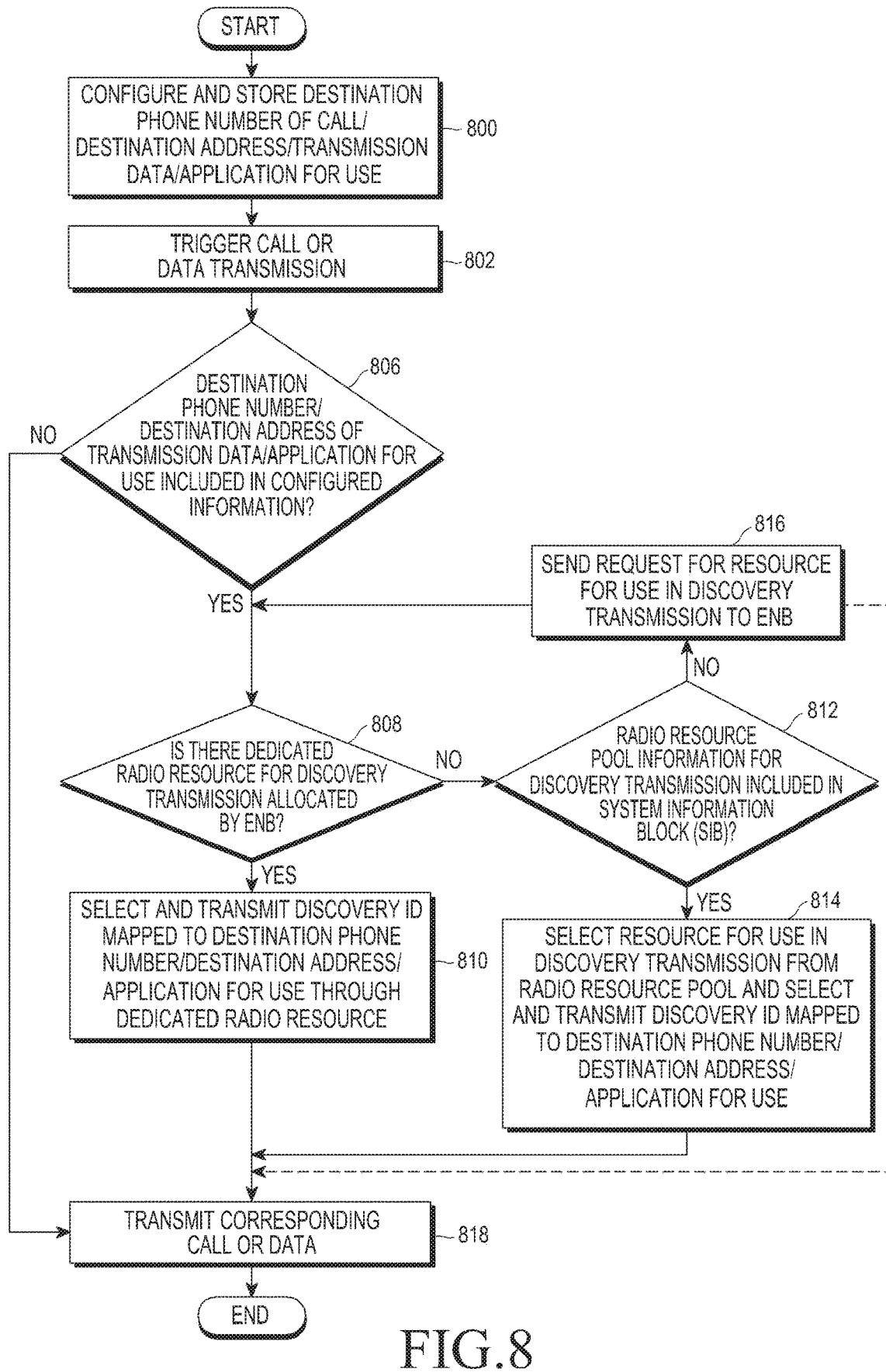
FIG. 8 illustrates a discovery signal transmission operation by a communication device according to a third embodiment of the present disclosure.

FIG. 8 illustrates a discovery signal transmission operation by a communication device according to a third embodiment of the present disclosure.

Referring to FIG. 8, the communication device (e.g., a UE) configures or stores a destination phone number of a call triggering the transmission of a discovery signal, a destination address of data transmission, or application information in operation 800. The configuring or storing operation by the communication device may be performed by, e.g., the user's input, the communication provider's settings, a command from the ProSe function, and the like.

The communication device performs a particular call, data transmission, or application driving in operation 802. The particular call, data transmission, or application driving may be performed, for example, by the user's input or when a certain condition is met.

The communication device determines whether the destination phone number of the call, the destination address of the data transmission, or the driven application is contained in preset (stored) information in operation 806.

As a result of the determination 806, when the destination phone number of the call, the destination address of the data transmission, and the driven application are not included in the preset (stored) information, the communication device transmits a call, transmits data, or executes an application without an additional operation in operation 818. As a result of the determination 806, when the destination phone number of the call, the destination address of the data transmission, or the driven application is included in the preset (stored) information, the communication device determines if there is a dedicated radio resource allocated by the base station for discovery signal transmission in operation 808.

If it is determined in operation 808 that there is a dedicated radio resource allocated by the base station for discovery signal transmission, the communication device transmits, through the dedicated radio resource, a discovery signal including a discovery ID mapped to the destination phone number of the call, the destination address of the data transmission, or the driven application in operation 810, and transmits the call, transmits the data, or executes the application in operation 818. If it is determined in operation 808 that there is no dedicated radio resource allocated by the base station for discovery signal transmission, the communication device determines if the SIB broadcast from the base station contains information regarding a radio resource pool for discovery signal transmission in operation 812.

If it is determined in operation 812 that the SIB contains the information regarding the radio resource pool for discovery signal transmission, the communication device selects a resource to be used for discovery signal transmission from the radio resource pool, transmits, through the selected resource, a discovery signal including a discovery ID mapped to the destination phone number of the call, the destination address of the data transmission, or the driven application in operation 814, and transmits the call, transmits the data, or executes the application in operation 818. If it is determined in operation 812 that the SIB contains no information regarding the radio resource pool for discovery signal transmission, the communication device transmits a request for a radio resource to be used for discovery signal transmission (e.g., through an RRC connection) to the base station in operation 816 and may repeat operation 808. In this case, selectively, the communication device may transmit the call, transmit the data, or execute the application in operation 818 without determining whether the base station responds to the request transmitted in operation 816 (808).

Although in the example illustrated in FIG. 8 the operation 808 of determining whether there is an allocated dedicated radio resource is performed earlier than the operation 812 of determining the radio resource pool through the SIB, the determining operations may be reversed in order.

Figure 9:
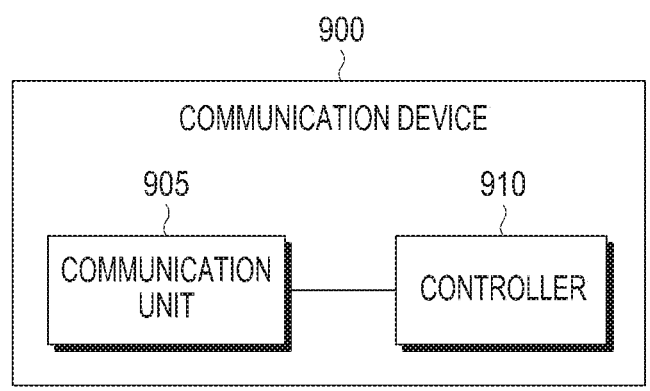
FIG. 9 illustrates a configuration of a communication device according to an embodiment of the present disclosure.

FIG. 9 illustrates a configuration of a communication device according to an embodiment of the present disclosure.

Referring to FIG. 9, a communication device 900 may include a communication unit (or transmission/reception unit) 905 communicating signals with other communication device or an entity in a network and a controller 910 controlling all of the operations performed by the communication device 900. It may be appreciated that all of the operations of the communication device or UE described above in connection with the first to third embodiments of the present disclosure are performed under the control of the controller 910. However, the controller 910 and the communication unit 905 are not necessarily implemented as separate devices, respectively, but may be implemented in a single configuration unit in the form of, e.g., a single chip.

It should be noted that the system configuration, various methods for determining CC/CE, signal flow between communication devices, communication flow between the communication device and the network entity, various methods for transmitting discovery signals by the communication device, and configuration of the communication device illustrated in FIGS. 1 to 9 as examples are not intended to limit the scope of the present disclosure. For example, the messages, signals, or operations in the constituent units described in connection with FIGS. 1 to 9 should not be interpreted as essential components to practice the present disclosure, and only some of the messages, signals, operations, or components may be included, or changes in order may be made to the operations without affecting the essence of the present disclosure.

The above-described operations may be realized by equipping a memory device retaining their corresponding codes in a communication device or a function in a communication system or in any constituent unit in a base station. For example, the controller in the entity, function, communication device, or the base station may execute the above-described operations by reading and executing the program codes stored in the memory device by a processor or central processing unit (CPU).

As described herein, various constituent units or modules in the entity, communication device, or base station may be operated using a hardware circuit, e.g., a complementary metal oxide semiconductor-based logic circuit, firmware, software, and/or using a hardware circuit, such as a combination of hardware, firmware, and/or software embedded in a machine-readable medium. As an example, various electric structures and methods may be executed using electric circuits, such as transistors, logic gates, or ASICs.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communicating by a second communication device in a communication system, the method comprising:
   transmitting a request for long-range communication support information to a first communication device through a short-range communication link;
   receiving the long-range communication support information from the first communication device; and
   directly accessing to an internet using the long-range communication support information received from the first communication device,
   wherein the long-range communication support information includes cellular network access information,
   wherein the cellular network access information includes a security parameter of the first communication device and at least one of an identifier of the first communication device or radio configuration information of the first communication device, and
   wherein the security parameter includes information on a security key currently in use by the first communication device and is used to omit an authentication and key agreement (AKA) or security setup process.

2. The method of claim 1, wherein the cellular network information further includes information on a serving cell of the first communication device to access to the internet.

3. The method of claim 2, wherein the information on the serving cell includes at least one of a radio frequency channel number, a cell identifier of the serving cell, downlink feedback channel configuration information of the serving cell, a system frame number of the serving cell, or random access channel configuration information of the serving cell.

4. The method of claim 1, wherein the radio configuration information includes at least one of physical layer configuration information, media access control (MAC) configuration information, or radio bearer configuration information configured in the first communication device.

5. The method of claim 1, wherein the short-range communication link comprises a Bluetooth communication link or a Wi-Fi communication link.

6. The method of claim 1, wherein the second communication device comprises a wearable communication device.

7. A second communication device in a communication system, the second communication device comprising:
   at least one processor configured to:
      transmit a request for long-range communication support information to a first communication device through a short-range communication link,
      receive the long-range communication support information from the first communication device, and
      directly access to an internet using the long-range communication support information received from the first communication device; and
   a communication unit configured to communicate data through the short-range communication link under the control of the at least one processor,
   wherein the long-range communication support information includes cellular network access information,
   wherein the cellular network access information includes a security parameter of the first communication device and at least one of an identifier of the first communication device or radio configuration information of the first communication device, and wherein the security parameter includes information on a security key currently in use by the first communication device and is used to omit an authentication and key agreement (AKA) or security setup process.

8. The second communication device of claim 7, wherein the cellular network access information further includes information on a serving cell of the first communication device to access to the internet.

9. The second communication device of claim 8, wherein the information on the serving cell includes at least one of a radio frequency channel number of the serving cell, a cell identifier of the serving cell, downlink feedback channel configuration information of the serving cell, a system frame number of the serving cell, or random access channel configuration information of the serving cell.

10. The second communication device of claim 7, wherein the radio configuration information includes at least one of physical layer configuration information, media access control (MAC) configuration information, or radio bearer configuration information configured in the first communication device.

11. The second communication device of claim 7, wherein the short-range communication link comprises a Bluetooth communication link or a Wi-Fi communication link.

12. The second communication device of claim 7, wherein the second communication device comprises a wearable communication device.

13. A method for communicating by a first communication device in a communication system, the method comprising:
   receiving a request for long-range communication support information from a second communication device through a short-range communication link;
   transmitting the long-range communication support information to the second communication device; and
   relaying a direct access from the second communication device to an internet, using the long-range communication support information transmitted to the first communication device,
   wherein the long-range communication support information includes cellular network access information, and
   wherein the cellular network access information includes a security parameter of the first communication device and at least one of an identifier of the first communication device or radio configuration information of the first communication device, and
   wherein the security parameter includes information on a security key currently in use by the first communication device and is used to omit an authentication and key agreement (AKA) or security setup process.

14. The method of claim 13, wherein the cellular network access information further includes information on a serving cell of the first communication device to access to the internet.

15. The method of claim 14, wherein the information on the serving cell includes at least one of a radio frequency channel number of the serving cell, a cell identifier of the serving cell, downlink feedback channel configuration information of the serving cell, a system frame number of the serving cell, or random access channel configuration information of the serving cell.

16. The method of claim 13, wherein the radio configuration information includes at least one of physical layer configuration information, media access control (MAC) configuration information, or radio bearer configuration information configured in the first communication device.

17. A first communication device in a communication system, the first communication device comprising:
   at least one processor configured to:
      receive a request for long-range communication support information from a second communication device through a short-range communication link,
      transmit the long-range communication support information to the second communication device, and
      relay a direct access from the second communication device to an internet, using the long-range communication support information transmitted to the first communication device; and
   a communication unit configured to communicate data through the short-range communication link under the control of the at least one processor,
   wherein the long-range communication support information includes cellular network access information,
   wherein the cellular network access information includes a security parameter of the first communication device and at least one of an identifier of the first communication device or radio configuration information of the first communication device, and
   wherein the security parameter includes information on a security key currently in use by the first communication device and is used to omit an authentication and key agreement (AKA) or security setup process.

18. The first communication device of claim 17, wherein the cellular network access information further includes information on a serving cell of the first communication device to access to the internet.

19. The first communication device of claim 18, wherein the information on the serving cell includes at least one of a radio frequency channel number of the serving cell, a cell identifier of the serving cell, downlink feedback channel configuration information of the serving cell, a system frame number of the serving cell, or random access channel configuration information of the serving cell.

20. The first communication device of claim 17, wherein the radio configuration information includes at least one of physical layer configuration information, media access control (MAC) configuration information, or radio bearer configuration information configured in the first communication device.

* * * * *